United States Patent

Schmitz et al.

[11] Patent Number: 6,061,619
[45] Date of Patent: May 9, 2000

[54] ELECTRONIC CLUTCH MANAGEMENT

[75] Inventors: Harald Schmitz, Dormagen; Boguslaw Maciejewski, Werdohl; Jörg Holwe, Hemer, all of Germany

[73] Assignee: LuK Lamellen und Kupplungsbau GmbH, Buhl, Germany

[21] Appl. No.: 08/697,232

[22] Filed: Aug. 21, 1996

Related U.S. Application Data

[63] Continuation-in-part of application No. 08/118,051, Sep. 8, 1993, abandoned.

[30] Foreign Application Priority Data

Sep. 9, 1992 [DE] Germany .............................. 42 30 131
Oct. 16, 1992 [DE] Germany .............................. 42 34 927

[51] Int. Cl.$^7$ .................................................. B60K 41/18
[52] U.S. Cl. .............................. 701/51; 701/84; 701/87; 477/166; 477/180
[58] Field of Search .................................. 701/51, 53, 54, 701/84, 87, 95; 477/84, 91, 166, 169, 175, 180; 192/3.63

[56] References Cited

U.S. PATENT DOCUMENTS

| | | | |
|---|---|---|---|
| 5,283,738 | 2/1994 | Schwab et al. ....................... | 364/424.1 |
| 5,351,776 | 10/1994 | Keller et al. ............................ | 180/79.1 |
| 5,380,257 | 1/1995 | Coffman et al. ........................ | 477/175 |
| 5,427,215 | 6/1995 | Jarvis ..................................... | 192/3.63 |
| 5,630,773 | 5/1997 | Slicker et al. .......................... | 477/176 |
| 5,725,456 | 3/1998 | Fischer et al. .......................... | 477/174 |

*Primary Examiner*—William A. Cuchlinski, Jr.
*Assistant Examiner*—Arthur Donnelly
*Attorney, Agent, or Firm*—Darby & Darby

[57] ABSTRACT

An electronic management system for an automatically adjustable clutch in a power train between a combustion engine and a manually shiftable transmission of a motor vehicle employs a microcontroller which regulates the transmission of torque by the clutch to initially effect a change from a disengaged condition to a condition of initial engagement with a maximal slip whenever the synchronization of the transmission following a manual shifting of the transmission into a different gear ratio takes place at that RPM of an input and/or an output component of the transmission which exceeds a predetermined threshold value, such as that corresponding to the maximum permissible RPM of the engine. The microcontroller varies the slip of the clutch until the RPM of the input and/or output component of the transmission decreases at least to the predetermined threshold value.

15 Claims, 3 Drawing Sheets

ELECTRONIC CLUTCH MANAGEMENT

CROSS-REFERENCE TO RELATED CASE

This is a continuation-in-part of our U.S. patent application Ser. No. 08/118,051 filed Sep. 8, 1993 for "ELECTRONIC CLUTCH MANAGEMENT SYSTEM" now abandoned.

BACKGROUND OF THE INVENTION

The invention relates to improvements in so-called electronic clutch managements (ECM) for use in motor vehicles. More particularly, the invention relates to improvements in systems for and methods of electronically managing automatically adjustable clutches in the power trains of motor vehicles. Still more particularly, the invention relates to a novel and improved system which can be utilized to manage or regulate the transmission of torque by an automatically adjustable clutch which is installed in a power train between a prime mover (such as a combustion engine) and a manually shiftable transmission of a motor vehicle. The invention also relates to a method of managing (i.e., of controlling the transmission of torque by) an automatically adjustable clutch (e.g., a friction clutch), particularly by resorting to the novel system.

It is already known to change the condition of an engageable, disengageable and partially engageable automatic clutch by a setting member which is displaceable under the command of a microcontroller. The arrangement is such that the clutch is disengaged without delay in response to actuation of a gear shift member (e.g., a lever) which is used by the operator of the motor vehicle to shift the transmission into a different gear, i.e., to change the ratio of the transmission. The microcontroller effects a reengagement of the clutch upon completion of shifting of the transmission into a different gear and the following synchronization of the transmission as soon as the microcontroller receives a signal denoting that the shifting of the transmission into a different gear is completed. A drawback of conventional electronic clutch management systems of the just outlined character is that, due to the mass inertia of the vehicle, the combustion engine can be "dragged" to increase its rotational speed (hereinafter called RPM for short) beyond a permissible limit during shifting of the transmission into a different gear, namely in response to shifting into too low a gear. Thus, there exists an urgent need for an effective protection of the engine against an increase (overrev) of its RPM beyond a still acceptable upper limit.

On the other hand, there can develop certain extreme driving circumstances, such as when the braking action is insufficient, when "dragging" of the engine to a high RPM might be desirable and advantageous in order to utilize the drag torque of the engine for the purpose of enhancing the braking action.

OBJECTS OF THE INVENTION

An object of the invention is to provide a novel and improved electronic clutch management system.

Another object of the invention is to provide a novel and improved method of managing or controlling the changes of the condition of an automatically adjustable clutch in the power train of a vehicle.

A further object of the invention is to provide an electronic clutch management system with an engagement strategy which effectively prevents overrevving of the combustion engine.

An additional object of the invention is to provide an electronic clutch management system which enables and permits the engine drag torque to be used for the purpose of enhacing the braking action.

Still another object of the invention is to provide a novel and improved method of enhancing the braking action in a motor vehicle.

A further object of the invention is to provide a power train which can be used in a motor vehicle and embodies an automatically adjustable clutch as well as the above outlined clutch management system.

Another object of the invention is to provide a motor vehicle having a power train emodying an automatically adjustable clutch between the prime mover and a manually shiftable transmission, and further having a novel and improved electronic management system for the clutch.

An additional object of the invention is to provide a simple, compact and inexpensive but reliable electronic clutch management system of the above outlined character.

SUMMARY OF THE INVENTION

One feature of the instant invention resides in the provision of an electronic management system for an adjustable clutch which has engaged and disengaged conditions as well as a plurality of intermediate conditions in which the clutch transmits torque with varying degrees of slip. The clutch is disposed in a power train of a motor vehicle between a prime mover (such as an internal combustion engine and hereinafter called engine or combustion engine) which is operable at a plurality of different RPMs, and a manually shiftable transmission having input and output components at least one of which is operated at a plurality of different RPMs. The transmission is of the type which undergoes a synchronization in response to manual shifting into one of a plurality of different gear ratios.

The improved clutch management system comprises first sensor means for generating first signals denoting the RPM of the engine, second sensor means for generating second signals denoting changes in the gear ratio of the transmission, third sensor means for generating third signals which denote the RPM of the at least one component of the transmission, and means for adjusting the clutch in response to at least some of the first, second and third signals to change the condition of the clutch from the disengaged condition to a predetermined intermediate condition, in which the clutch is capable of transmitting torque with a minimum of slip, at least during synchronizing of the transmission following the shifting into a gear and while the RPM of the at least one component of the transmission exceeds a predetermined value. The adjusting means is further designed to continuously vary the intermediate condition of the clutch until the RPM of the at least one component of the transmission decreases at least to the threshold value, e.g., at least slightly below the threshold value.

The adjusting means can comprise one or more microcontrollers.

The adjusting means can further comprise means for automatically disengaging the clutch in response to manual manipulation of a gear shift member (such as a lever) for the transmission.

The adjusting means can be designed in such a way that it is operative to cause the clutch to assume the predetermined intermediate condition (a) during and/or (b) subsequent to synchronizing of the transmission following the generation of a (second) signal which denotes a completed change of the gear ratio of the transmission.

The arrangement is preferably such that the adjusting means is designed to embody means for changing the condition of the clutch to the predetermined intermediate condition at a predetermined speed.

In accordance with a presently preferred embodiment of the improved electronic clutch management system, the adjusting means is operative to vary the intermediate condition of the clutch in accordance with the following algorithm: $H(K)=\Delta(K) * H$. In this algorithm, $\Delta(K) == [EngineRPM_{max}-EngineRPM_{(t)}]* K_1+[EngineRPM_{(t)}-EngineRPM_{(t-\Delta t)}]*K_2$; $K_1$ and $K_2$ are programmable factors which permit mutually independent weighting of the constituents of (K) (the direction of adjustment of the clutch between the engaged and disengaged conditions is a function of the (positive or negative) sign of $\Delta(K)$); t is the time of the generation of a first signal; $\Delta t$ is the interval between the generation of two successive first signals; H is a constant; $EngineRPM_{max}$ is one of (a) a selectable limit value and (b) a selectable threshold value of the RPM of the engine; $EngineRPM_{(t)}$ is the RPM of the engine at the time t; $EngineRPM_{(t-\Delta t)}$ is the RPM of the engine at the instant $t-\Delta t$; and K is a variable function of time).

Another feature of the invention resides in the provision of a method of electronically managing an adjustable clutch which has engaged and disengaged conditions and a plurality of intermediate conditions in which the clutch transmits torque with varying degrees of slip. The clutch is disposed in a power train of a motor vehicle between a combustion engine which is operable at a plurality of different RPMs and a manually shiftable transmission having input and output components at least one of which is rotatable at a plurality of different RPMs. The transmission has a plurality of different speed ratios and undergoes a synchronization in response to shifting into any one of the plurality of different speed ratios. The improved method comprises the steps of generating first signals which denote the RPM of the engine, generating second signals which denote the changes in the gear ratio of the transmission, generating third signals denoting the changes of the RPM of the at least one component of the transmission, disengaging the clutch in response to actuation of a gear shift member for the transmission, changing the condition of the clutch to a predetermined intermediate condition - in which the clutch is capable of transmitting torque with a maximum slip—at least during synchroniation of the transmission in response to the generation of a third signal denoting that the RPM of the at least one component of the transmission exceeds a predetermined value, and continuously varying the intermediate condition of the clutch until the RPM of the at least one component of the transmission decreases at least to the predetermined value.

The step of continuously varying the intermediate condition of the clutch can be carried out during and/or subsequent to synchronization of the transmission.

The method can further comprise the step of carrying out the clutch disengaging step at a predetermined speed.

Still further, the method preferably comprises the step of calculating the intermediate condition of the clutch in accordance with the afore-outlined algorithm, namely:

$H(K)=\Delta(K) * H$.

The novel features which are considered as characteristic of the invention are set forth in particular in the appended claims. The improved electronic clutch management system itself, however, both as to its construction and its mode of operation, together with additional features and advantages thereof, will be best understood upon perusal of the following detailed description of certain presently preferred specific embodiments with reference to the accompanying drawings.

DESCRIPTION OF PREFERRED EMBODIMENTS

Figure 1:
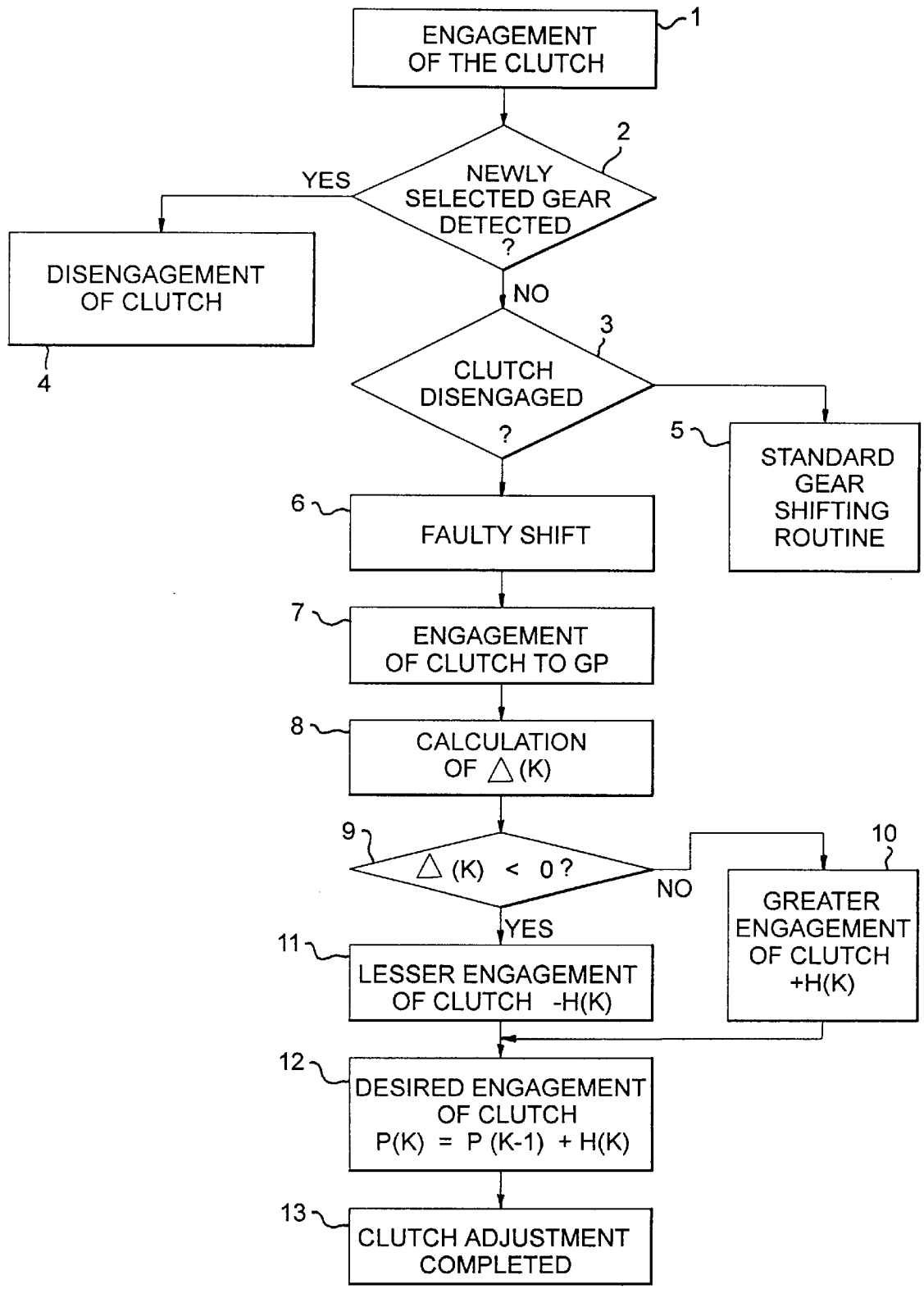
FIG. 1 is a flow chart representing the clutch operating strategy in accordance with a presently preferred embodiment of the invention.
Figure 2:
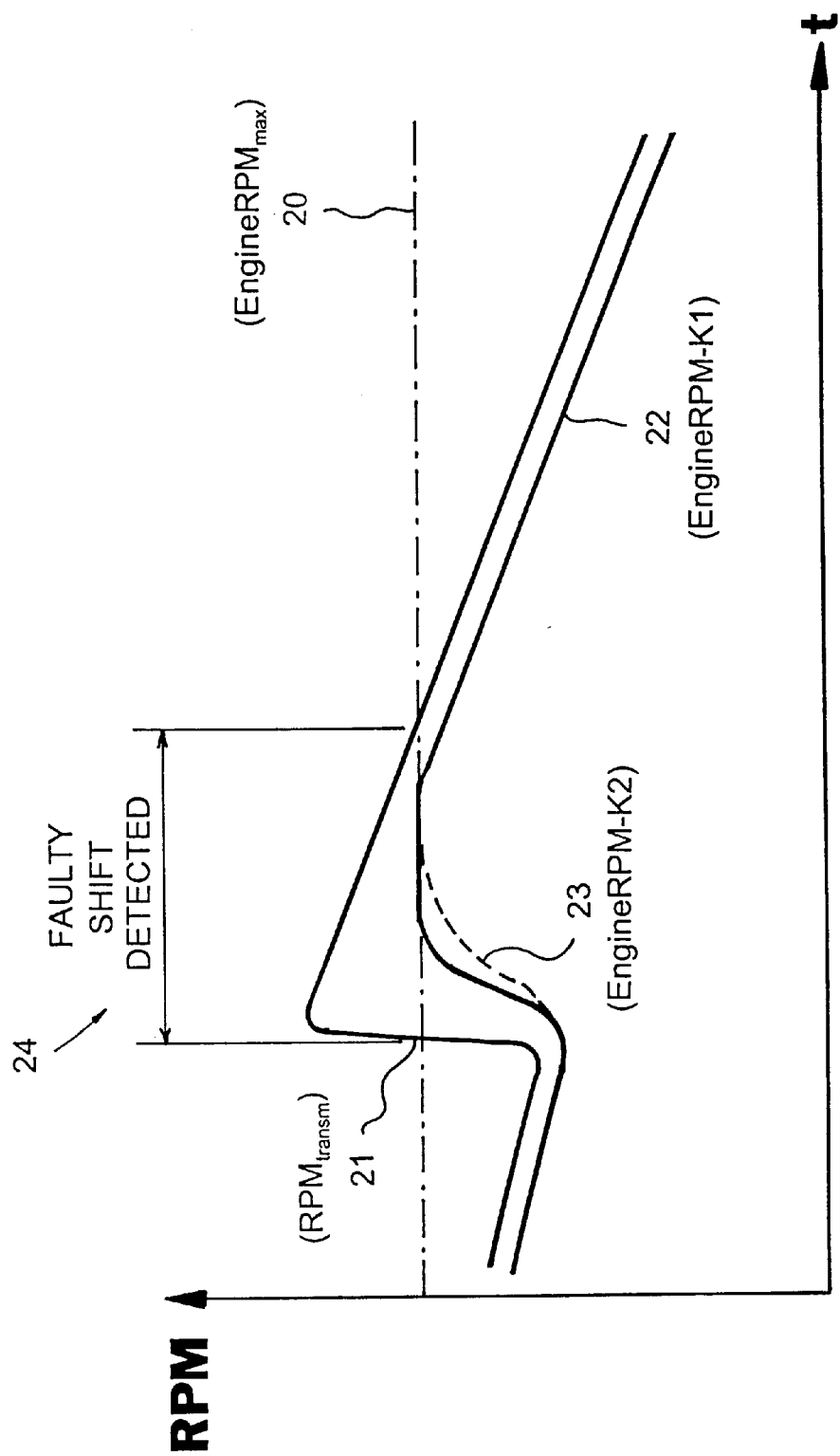
FIG. 2 is a diagram wherein the curves denote the RPMs of the combustion engine and of one of the input and output components of the manually shiftable transmission.

The block 1 in the flow chart of FIG. 1 denotes the clutch engaging step following a shift in the gear ratio of the transmission, i.e., a change into a different gear. The block 2 of FIG. 1 denotes the step of ascertaining by a suitable sensor whether or not the shifting of the transmission into a different gear was detected. The novel electronic clutch management system (shown at 34 in FIG. 3) disengages the automatically adjustable clutch (shown at 32 in FIG. 3) when the monitoring as per step denoted by the block 2 fails to entail the generation of a signal denoting that the transmission (shown at 33 in FIG. 3) has been shifted into a different gear. The clutch disengaging step is shown at 3. On the other hand, if the monitoring at 2 results in the generation of a signal denoting the completion of shifting of the transmission 33 into a different gear, the next step (see the block 4 in the flow chart of FIG. 1) involves a determination whether or not the RPM at the input or output of the transmission 33 (note the signal generating sensors 38 and 39 shown in FIG. 3) is less than or matches a threshold or maximum permissible RPM of the engine. The maximum permissible RPM of the engine (Engine $RPM_{max}$) is denoted in the diagram of FIG. 2 by a straight dot-dash line curve 20. The RPM at the input of the transmission 33 (i.e., as measured by the sensor 38) is designated $RPM_{transm}$ and is represented in the diagram of FIG. 2 by a solid-line curve 21.

If $RPM_{transm}$ is less than or matches $EngineRPM_{max}$, the transmission 33 is synchronized and the clutch 32 is engaged. Thus, this involves a standard transmission gear shifting routine (block 5). The predetermined threshold RPM of the transmission (sensor 38) is dependent upon the maximum permissible RPM of the engine ($EngineRPM_{max}$).

The synchronizing operation is a procedure which takes place in synchronized transmissions and involves a conformance of the RPMs of various components of the transmission to one another.

When the synchronizing subsequent to the shifting of the transmission 33 into a different gear is completed and the predetermined threshold value of the RPM of the transmission (sensor 38) is exceeded, this is recognized as a faulty shift (denoted by the block 6 in the flow chart of FIG. 1) and the clutch 32 is engaged only to a point GP (block 7). The clutch engagement point GP can be defined as that intermediate condition of the clutch which is between the fully engaged and fully disengaged conditions and in which the clutch is capable of transmitting torque with a maximum of slip. The clutch 32 transmits a torque greater than at the engagement point GP in any other of the the plurality of its intermediate positions.

The sensor 38 can be designed to transmit signals denoting the RPM at the input of the manual transmission 33 and/or to transmit signals denoting one or more other parameters, particularly whether the transmission is shifted into a neutral gear, into a reverse gear or into one of two or more forward gears.

The block 8 in the flow chart of FIG. 1 denotes the determination of $\Delta(K)$, namely a value which determines the desired change of the extent of engagement $H(K)$ of the clutch 32 in accordance with the algorithm $H(K)=\Delta(R) * H$. H is a preselectable constant. Thus, the step denoted by the block 8 in the flow chart of FIG. 1 denotes the calculation of $\Delta(K)$ for utilization in the aforementioned algorithm and, once the value of $\Delta(K)$ is ascertained, one can determine the value of $H(K)$.

The block 9 denotes the step of ascertaining whether or not $\Delta(K)$ is less than zero. $H(K)$ is positive if the value of $\Delta(K)$ exceeds zero, i.e., the clutch is adjusted in a sense to transmit a greater torque (block 10). If $\Delta(K)$ is less than zero, $H(K)$ is negative and the clutch is adjusted in a sense to reduce the magnitude of transmitted torque, i.e., to operate with a greater slip (block 11).

The block 12 denotes the determination of the desired condition of the $P(K)$ of the clutch so that $P(K)=P(K-1)+H(K)$, wherein $P(K)$ is the desired engagement during a time interval k, $P(K-1)$ is the desired engagement during the interval k-1, and $H(K)$ is the extent of change of the engagement of the clutch at the instant K.

Thus, the clutch is adjusted to assume the desired condition of engagement in dependency upon $\Delta(K)$, and the conditon "faulty shift" is terminated in that the transmission is shifted into a different gear when $RPM_{transm}$ drops below the threshold value $EngineRPM_{max}$. Such adjustment of the extent of engagement of the clutch 32 is denoted by the block 13.

As already mentioned above, the straight dot-dash line curve 20 in the diagram of FIG. 2 denotes the maximum permissible RPM of the engine 32 (FIG. 3), i.e., the selected value of $EngineRPM_{max}$. The curve 21 in the diagram of FIG. 2 denotes variations of the RPM of the transmission 33, namely $RPM_{transm}$, as a function of time t, and the curve 22 denotes the variations of the RPM of the engine, namely EngineRPM, based on a first selected constant $K_1$. The broken-line curve 23 represents the changes of EngineRPM if the selected constant is $K_2$. Reference should be had to the equation for the determination of $\Delta(K)$.

The progress of the curve 21 indicates that the RPM of the transmission 33 rises abruptly during synchronization following a shift into a different gear so that $RPM_{transm}$ rises above $EngineRPM_{max}$. The value of $RPM_{transm}$ (curve 21) then gradually decreases after having risen to a maximum value so that, upon the elapse of a certain time interval, the value of $RPM_{transm}$ is again below the value of the maximum permissible RPM of the engine ($EngineRPM_{max}$).

The condition "faulty shift" is detected during an abrupt rise of $RPM_{transm}$, namely as soon as $RPM_{transm}$ exceeds $EngineRPM_{max}$.

Synchronizing of the transmission 33 upon selection of a different gear ratio starts at 24, i.e., while the value of $RPM_{transm}$ is on the increase above the RPM denoted by the dot-dash line 20.

The clutch 32 is engaged to the point GP so that the RPM of the engine 31 (curve 22) is "dragged" to the value of $EngineRPM_{max}$ while the clutch is caused to transmit torque with a highly pronounced slip. As can be seen in FIG. 2, the operation (i.e., the extent of engagement or the extent of slip) of the clutch 32 is thereupon regulated in such a way that the RPM denoted by the curve 22 matches the value of $EngineRPM_{max}$. Such situation prevails until the RPM of the transmission 33 (curve 21) decreases because this causes a drop of the engine RPM (curve 22) below the selected value of Engine $RPM_{max}$.

By properly selecting the factor K (such as $K_1$ or $K_2$), one can influence the progress of the RPM of the engine 31 (compare the curves 22 and 23 in the diagram of FIG. 2) upon detection of the "faulty shift" condition.

The desired extent ($H(K)$) of engagement of the clutch 32 is that extent of engagement (or that intermediate condition of the clutch) which is continuously calculated by the microcontroller 34 and is necessary in order to engage the clutch to a calculated extent $P(K)$. By way of example, a desired extent of engagement of the clutch 32 (i.e., a desired extent of slip) can be calculated in such a way that, when the threshold RPM of the transmission 33 is exceeded, the RPM of the engine 31 does not rise above the preselected threshold value (curve 20 in FIG. 2). The exact value of $EngineRPM_{max}$ is a preselectable threshold value or a preselectable threshold for the RPM of the engine 31.

The microcontroller 34 is designed to calculate the value of $\Delta(K)$ in accordance with the following equation:

$$\Delta(K) = [EngineRPM_{max} - EngineRPM_{(t)}] * K_1 + [EngineRPM_{(t)} - EngineRPM_{(t-\Delta t)}] * K_2.$$

In this equation, $K_1$ and $K_2$ are programmable factors which permit mutually independent weighting of the constituents of $(K)$, t is the time of the generation of a (first) signal (sensor 37 in FIG. 3) which denotes the RPM of the engine 31, $\Delta t$ is the interval between the generation of two successive first signals (sensor 37), H is a constant, $EngineRPM_{max}$ is one of (a) a selectable limit value and (b) a selectable threshold value of the RPM of the engine, the value of $EngineRPM_{(t)}$ is that of the RPM of the engine 31 at the time t, $EngineRPM_{(t-\Delta t)}$ is the RPM of the engine 31 at the instant $t-\Delta t$, and K is a variable function of time. The direction of adjustment of the clutch 32 (i.e., toward the fully engaged condition or toward the disengaged condition) is a function of the (positive or negative) sign of $\Delta(K)$. If $\Delta(K)>0$, the clutch 32 is adjusted in a direction toward transmission of greater torque (i.e., the slip of the clutch is reduced). On the other hand, if $\Delta(K)<0$, the clutch 32 is adjusted in a direction toward the transmission of smaller torques (i.e., the slip of the clutch is increased).

An important advantage of the improved electronic clutch management is that, in the event of accidental selection of a transmission ratio which is too low (e.g., from the third or second forward speed into the first forward speed), such "faulty shift" is recognized through constant monitoring of the RPM of the transmission 33 and then the clutch 32 is not fully engaged but only up to its engagement point (predetermined intermediate condition) GP. From this engagement point on, the clutch 32 can transmit torque but operates with a desired or requisite slip so that the RPM of the engine will not exceed a predetermined RPM of the engine, particulary the maximum permissible value $EngineRPM_{max}$.

Figure 3:
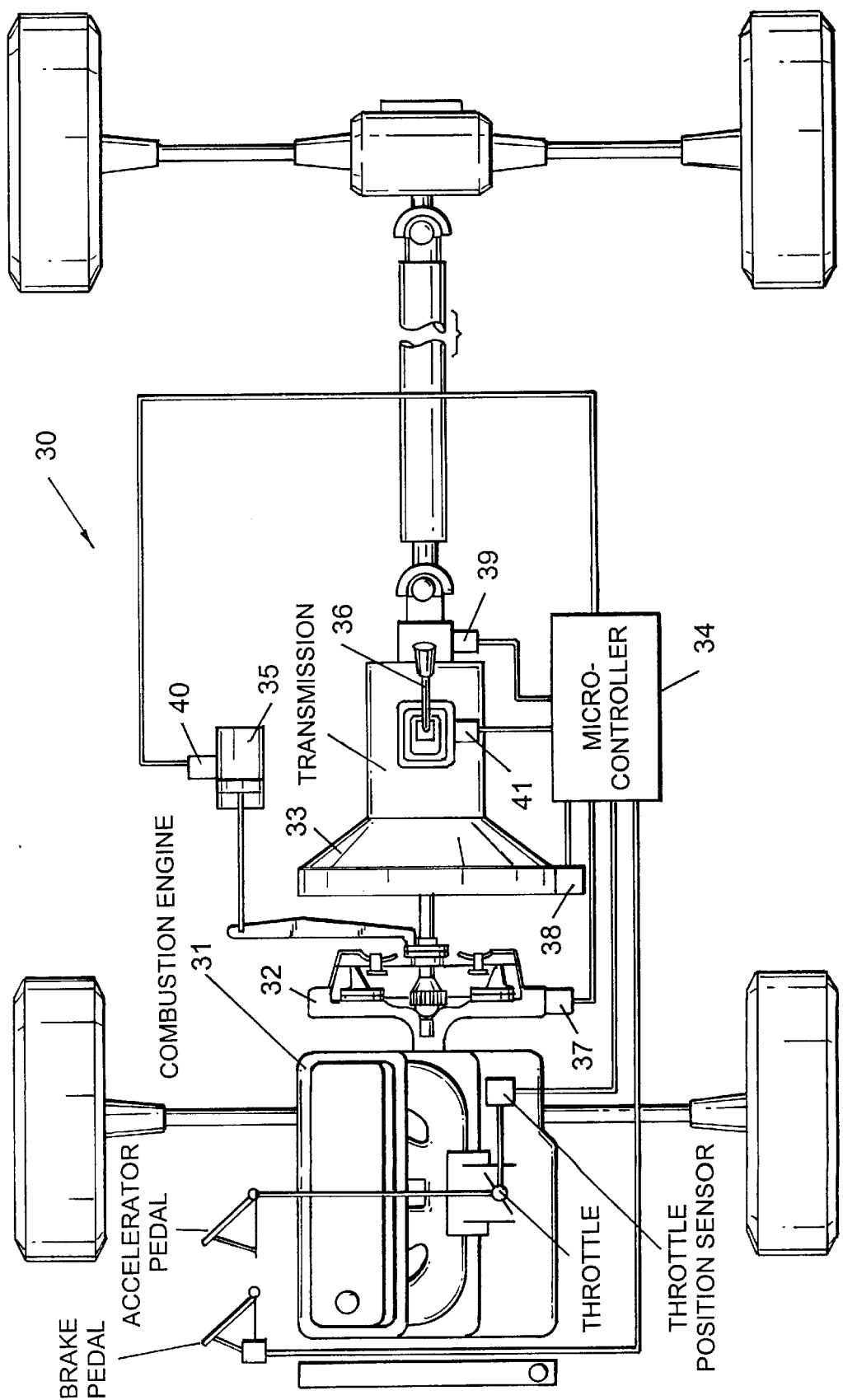
FIG. 3 is a somewhat diagrammatic view of certain component parts of a motor vehicle emodying a combustion engine, a manually shiftable transmission, an automatically adjustable clutch in the power train between the engine and the transmission, and a microcontroller which manages the transmission of torque by the clutch.

FIG. 3 shows certain component parts of a motor vehicle 30, such as the combustion engine 31, the automatically adjustable clutch 32, and the manually shiftable transmission 33. The latter can be shifted into different gears by a lever 36.

The microcontroller 34 receives signals from a plurality of sensors including the aforementioned sensors 38, 39 (RPM at the input and output of the transmission 33), the sensor 37 (RPM of the engine 31), and a sensor 40 serving to monitor an actuator 35 for the clutch 32. The actuator 35 receives signals from the output of the microcontroller 34. A further sensor 41 is provided to transmit to the microcontroller 34 signals denoting the position of the lever 36, i.e., the selected ratio of the transmission 33, namely whether the transmission is shifted to neutral, into reverse or into one of two or more forward gears.

FIG. 3 further shows certain additional component parts of the engine, namely parts which are not directly associated with the novel electronic clutch management. These include a throttle, a throttle position sensor (connected to an input of the microcontroller 34), an accelerator pedal, and a brake pedal.

The exact construction of the clutch 32 (except that it is an automatically adjustable clutch) forms no part of the present invention. This clutch can be a push-type or a pull-type clutch.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of electronic clutch management systems and, therefore, such adaptations should and are intended to be comprehended within the meaning and range of equivalence of the appended claims.

What is claimed is:

1. Electronic management system for an adjustable clutch which has engaged and disengaged conditions and a plurality of intermediate conditions in which the clutch transmits torque with varying degrees of slip, the clutch being disposed in a power train of a motor vehicle between a combustion engine operable at a plurality of different RPMs and a manually shiftable transmission having input and output components at least one of which is operated at a plurality of different RPMs, the transmission undergoing a synchronization in response to manual shifting into one of a plurality of different speed ratios, comprising:

first sensor means for generating first signals denoting changes in the gear ratio of the transmission;

second sensor means for generating second signals denoting the RPM of the at least one component of the transmission; and means for adjusting said clutch in response to at least one of said signals to change the condition of the clutch from the disengaged condition to a predetermined intermediate condition, in which the clutch is capable of transmitting torque with a maximum of slip, at least during synchronizing of the transmission following the shifting into a gear and while the RPM of the at least one component of the transmission exceeds a predetermined threshold value, and to vary the intermediate condition of the clutch until the RPM of the at least one component of the transmission decreases at least to said threshold value.

2. The system of claim 1, wherein said adjusting means comprises at least one microcontroller.

3. The system of claim 1, wherein said adjusting means includes means for automatically disengaging said clutch in response to manual manipulation of a gear shift member for said transmission.

4. The system of claim 1, wherein said adjusting means is operative to cause said clutch to assume said predetermined intermediate condition during synchronizing of said transmission subsequent to the generation of a first signal denoting a completed change of the gear ratio of the transmission.

5. The system of claim 1, wherein said adjusting means is operative to cause said clutch to assume said predetermined intermediate condition subsequent to synchronizing of said transmission and in response to the generation of a first signal denoting a completed change of the gear ratio of the transmission.

6. The system of claim 1, wherein said adjusting means includes means for changing the condition of said clutch to said predetermined intermediate condition at a predetermined speed.

7. The system of claim 1, further comprising third sensor means for generating third signals denoting the RPM of the engine, said adjusting means being operative to vary the intermediate condition of the clutch in accordance with the following algorithm:

$$H(K) = \Delta(K) * H,$$

wherein $\Delta(K) = [\text{EngineRPM}_{max} - \text{EngineRPM}_{(t)}] * K_1 + [\text{EngineRPM}_{(t)} - \text{EngineRPM}_{(t-\Delta t)}] * K_2$, $K_1$ and $K_2$ are programmable factors which permit mutually independent weighting of the constituents of (K), the direction of adjustment of said clutch between said engaged and disengaged conditions being a function of a positive or negative sign of $\Delta(K)$, t is the time of the generation of a third signal, $\Delta t$ is the interval between the generation of two successive third signals, H is a constant, $\text{EngineRPM}_{max}$ is one of (a) a selectable limit value and (b) a selectable threshold value of the RPM of the engine, $\text{EngineRPM}_{(t)}$ is the RPM of the engine at the time t, $\text{EngineRPM}_{(t-\Delta t)}$ is the RPM of the engine at the instant $t-\Delta t$, and K is a variable function of time.

8. A method of electronically managing an adjustable clutch which has an engaged condition, a disengaged condition and a plurality of intermediate conditions in which the clutch transmits torque with varying degrees of slip, the clutch being disposed in a power train of a motor vehicle between a combustion engine which is operable at a plurality of different RPMs and a manually shiftable transmission including rotary input and output components at least one of which is rotatable at a plurality of different RPMS, the transmission having a plurality of different speed ratios and undergoing a syncronization in response to manual shifting into any one of said plurality of different speed ratios, the method comprising the following steps:

generating second signals denoting the changes in the gear ratio of the transmission;

generating second signals denoting the changes of the RPM of the at least one component of the transmission;

disengaging the clutch in response to actuation of a gear shift member for the transmission;

changing the condition of the clutch to a predetermined intermediate condition, in which the clutch is capable of transmitting torque with a maximum slip, at least during synchronization of the transmission in response to the generation of a third signal denoting that the RPM of the at least one component of the transmission exceeds a predetermined value; and varying the intermediate condition of the clutch until the RPM of the at least one component of the transmission decreases at least to said predetermined value.

9. The method of claim 8, wherein said step of varying the intermediate condition of the clutch is carried out subsequent to synchronization of the transmission.

10. The method of claim 8, further comprising the step of carrying out said clutch disengaging step at a predetermined speed.

11. The method of claim 8, further comprising the steps of generating third signals denoting the RPM of the engine and calculating the intermediate condition of the clutch in accordance with the following algorithm:

$$H(K) = \Delta(K) * H,$$

wherein $\Delta(K0) = [EngineRPM_{max} - EngineRPM_{(t)}]* K_1 + [EngineRPM_{(t)} - EngineRPM_{(t-\Delta t)}]* K_2$, $K_1$ and $K_2$ are programmable factors which Permit mutually independent weighting of the constituents of $\Delta(K)$, the direction of adjustment of said clutch between said engaged and disengaged conditions being a function of a positive or negative sign of $\Delta(K)$, t is the time of generation of a third signal, $\Delta t$ is the interval between the generation of two successive third signals, H is a constant, Engine $RPM_{max}$ is one of (a) a selectable limit value and (b) a selectable threshold value of the RPM of the engine, $EngineRPM_{(t)}$ is the RPM of the engine at the time t, $EngineRPM_{(t-\Delta t)}$ is the RPM of the engine at the instant $t-\Delta t$, and K is a variable function of time.

12. The system of claim 1, wherein said adjusting means is arranged to continuously vary the intermediate condition of the clutch until the RPM of the at least one component of the transmission decreases at least to said threshold value.

13. The method of claim 8, wherein said varying step includes continuously varying the intermediate condition of the clutch until the RPM of the at least one component of the transmission decreases at least to said predetermined value.

14. Electronic management system for an adjustable clutch which has engaged and disengaged conditions and a plurality of intermediate conditions in which the clutch transmits torque with varying degrees of slip, the clutch being disposed in a power train of a motor vehicle between a combustion engine operable at a plurality of different RPMs and a transmission having input and output components at least one of which is operated at a plurality of different RPMs, the transmission undergoing a synchronization in response to shifting into one of a plurality of different speed ratios, comprising:

first sensor means for generating first signals denoting changes in the gear ratio of the transmission;

second sensor means for generating second signals denoting the RPM of the at least one component of the transmission; and means for adjusting said clutch in response to at least one of said signals to change the condition of the clutch from the disengaged condition to a predetermined intermediate condition, in which the clutch is capable of transmitting torque with a maximum of slip, at least during synchronizing of the transmission following the shifting into a gear and while the RPM of the at least one component of the transmission exceeds a predetermined threshold value, and to continuously vary the intermediate condition of the clutch until the RPM of the at least one component of the transmission decreases at least to said threshold value.

15. A method of electronically managing an adjustable clutch which has an engaged condition, a disengaged condition and a plurality of intermediate conditions in which the clutch transmits torque with varying degrees of slip, the clutch being disposed in a power train of a motor vehicle between a combustion engine which is operable at a plurality of different RPMs and a transmission including rotary input and output components at least one of which is rotatable at a plurality of different RPMs, the transmission having a plurality of different speed ratios and undergoing a synchronization in response to shifting into any one of said plurality of different speed ratios, the method comprising the following steps:

generating first signals denoting the changes in the gear ratio of the transmission;

generating second signals denoting the changes of the RPM of the at least one component of the transmission;

disengaging the clutch in response to actuation of a gear shift member for the transmission;

changing the condition of the clutch to a predetermined intermediate condition, in which the clutch is capable of transmitting torque with a maximum slip, at least during synchronization of the transmission in response to the generation of a second signal denoting that the RPM of the at least one component of the transmission exceeds a predetermined value; and continuously varying the intermediate condition of the clutch until the RPM of the at least one component of the transmission decreases at least to said predetermined value.

* * * * *